July 31, 1923.

C. J. HARTER

APPARATUS FOR TESTING THE CONTOURS OF GEAR TEETH

Filed Sept. 20, 1921   5 Sheets-Sheet 1

1,463,580

INVENTOR
C. J. Harter
BY
Howard P. Denison
ATTORNEY

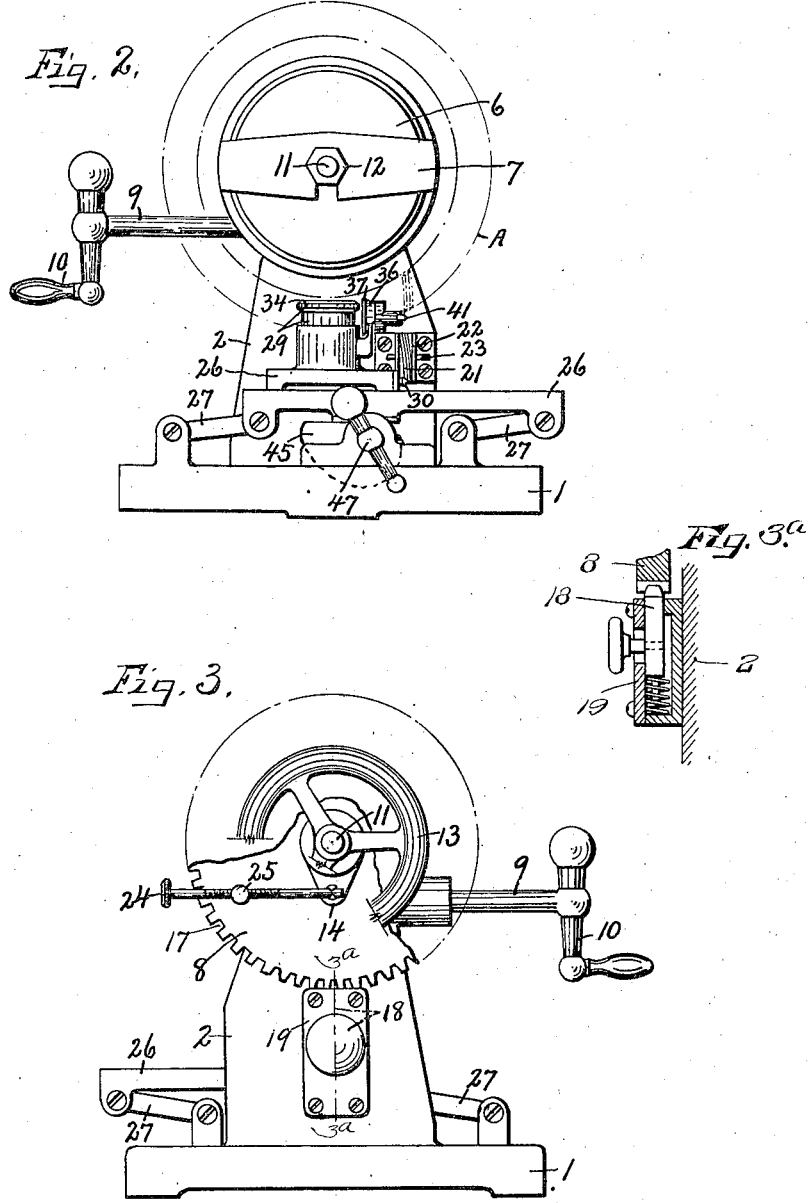

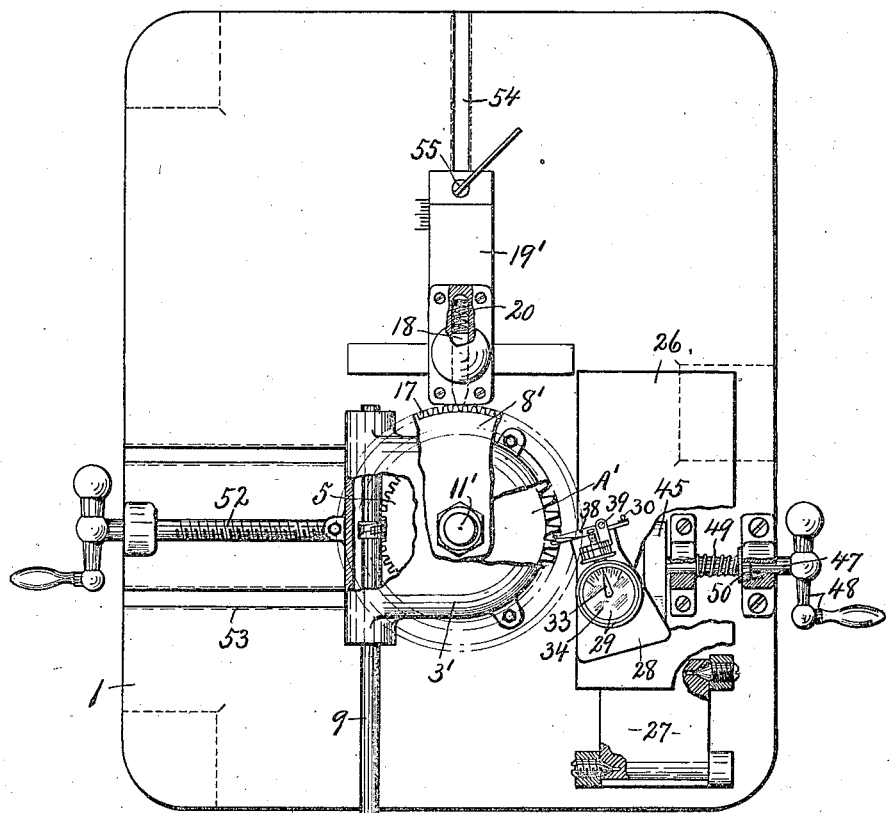
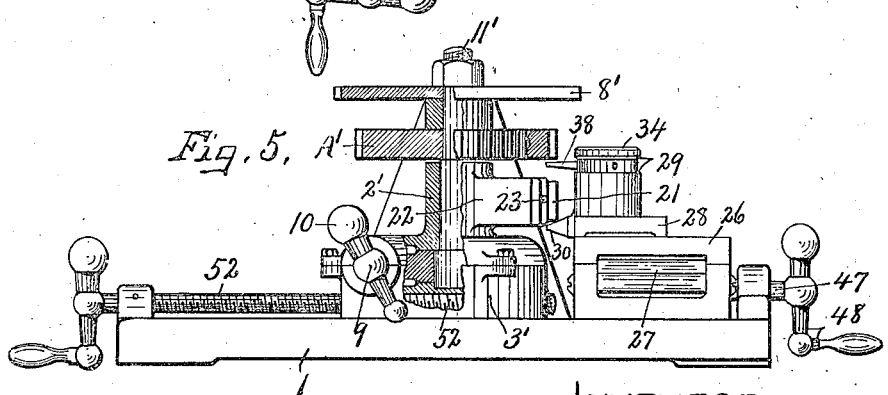

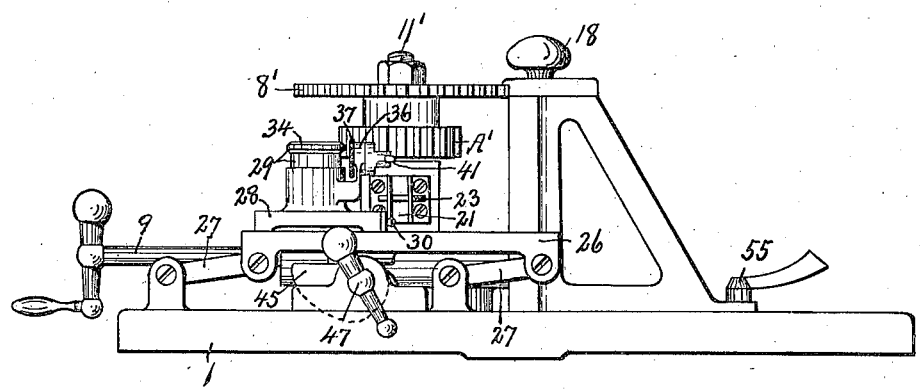
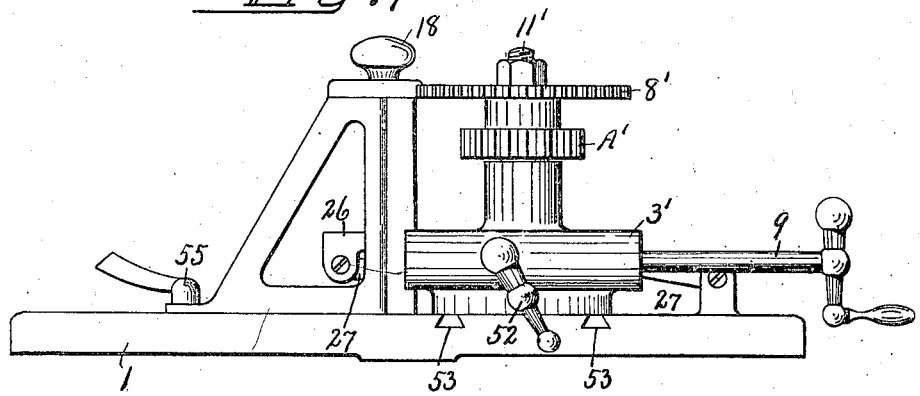

July 31, 1923. 1,463,580
C. J. HARTER
APPARATUS FOR TESTING THE CONTOURS OF GEAR TEETH
Filed Sept. 20, 1921 5 Sheets-Sheet 5
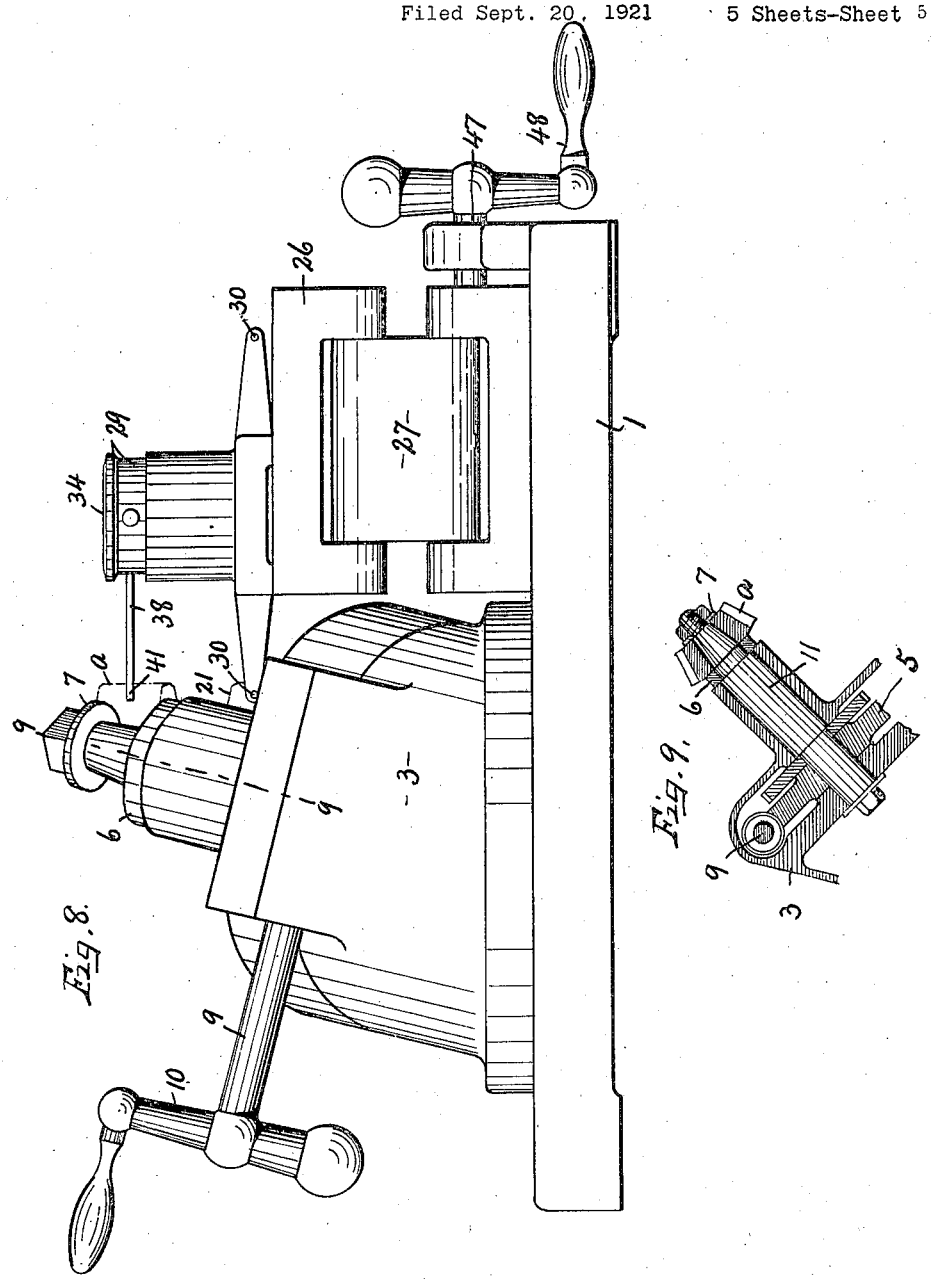

Patented July 31, 1923.

1,463,580

UNITED STATES PATENT OFFICE.

CLARENCE J. HARTER, OF SYRACUSE, NEW YORK.

APPARATUS FOR TESTING THE CONTOURS OF GEAR TEETH.

Application filed September 20, 1921. Serial No. 501,873.

*To all whom it may concern:*

Be it known that I, CLARENCE J. HARTER, of Syracuse, in the county of Onondaga, in the State of New York, have invented new and useful Improvements in an Apparatus for Testing the Contours of Gear Teeth, of which the following, taken in connection with the accompanying drawings, is a full, clear, and exact description.
This invention relates to an apparatus for testing the accuracy of the profile or contour, angles, depths, heights, pitch diameter and spacing of the teeth of all types of toothed gears and also of cutters having teeth similar to the gear teeth, the main object being to provide simple and efficient means for determining the accuracy or degree of inaccuracy of those factors by comparison with the accurate like factors of a master tooth made in accordance with a predetermined formula as a standard of the teeth of the particular gear under test.

Other objects relating to specific parts of the apparatus will be brought out in the following description:

In the drawings:

Figs. 2 and 3 are opposite side elevations of the same machine on a reduced scale.

Figure 1:
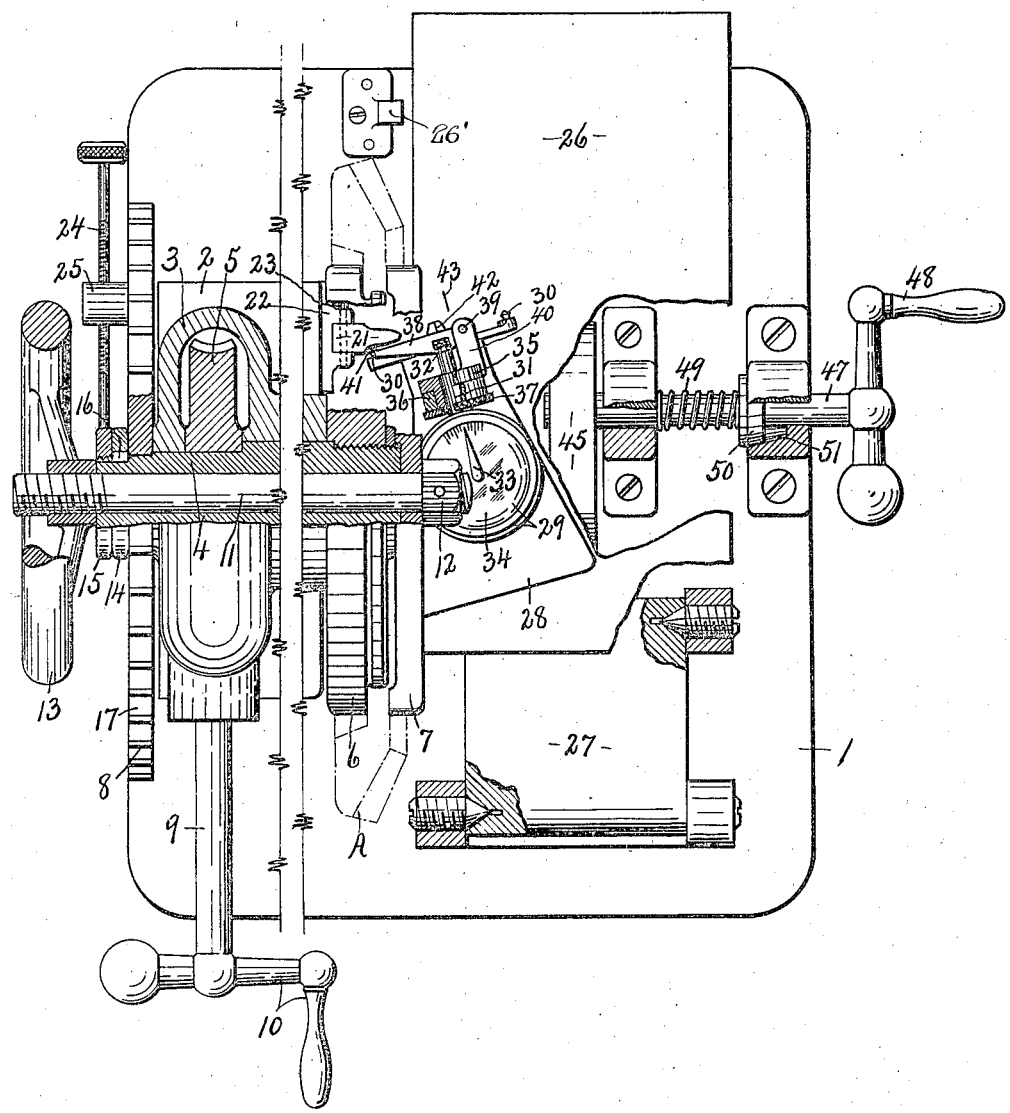
Fig. 1 is a top plan, partly broken away and partly in section, of one form of apparatus embodying various features of the invention set for testing the teeth of a spiral beveled gear.

Fig. 3ª is a sectional view on the line 3ª—3ª of Fig. 3.

Fig. 4 is a top plan of a modified form of my invention for testing the teeth of spur gears.

Fig. 5 is a side elevation partly in section of the device shown in Fig. 4.

Figs. 6 and 7 are opposite side elevations of the device shown in Figs. 4 and 5.

Fig. 8 is a side elevation of a further modified form of my invention for testing spiral beveled pinions.

Fig. 9 is a detail sectional view taken on line 9—9, Fig. 8.

The device shown in Figs. 1, 2 and 3 comprises a supporting base —1— having an upright standard or bracket —2— provided with a gear case or housing —3— in which is journaled a tubular shaft —4— carrying a worm gear —5—, a pair of clamping members —6— and —7— and an index wheel —8—, the gear —5— being engaged by a worm shaft —9— having a hand crank —10— by which it may be rotated for rotating the shaft —4— through the medium of the worm gear —5—.

A clamping bolt —11— is passed axially through the tubular shaft —4— for clamping the gear as —A— to be tested between the members —6— and —7—, and for this purpose its inner end is provided with a shoulder —12— for engaging the adjacent end face of the member —7—, while its outer end is threaded and engaged by a hand wheel nut —13— bearing against the adjacent outer end face of the shaft —4—, the clamping member —6— being tightly screwed upon the inner end of the shaft, while the member —7— is slidably mounted upon the inner end of the clamping bolt —11— for tightening and releasing the gear —A— as the nut —13— is tightened and loosened upon the clamping bolt —11—.

The index wheel —8— is loosely mounted upon a reduced outer end of the shaft —4— and is held in place by the hub of a radial crank arm —14— and nut —15—, the crank arm —14— being also loosely splined by a key 16 upon the outer end of the shaft —4— between the nut —15— and adjacent face of the index wheel —8— to frictionally drive said index wheel when the nut 15 is tightened and to permit the index wheel to be adjusted rotarily to bring its peripheral notches —17— into proper relation with the teeth of the wheel under test and a locking bolt 18, it being understood that the number and spacing of these notches correspond exactly to the number and spacing of the teeth of the gear so that the rotation of the index wheel one notch space will impart a similar rotary motion to the gear under test one toothed space.

A locking bolt —18— Figure 3ª is movable in a guide —19— on the bracket —3— into and out of engagement with the notches of the index wheel —8— to hold the same with the shaft —4— and gear —A— in their adjusted positions and to permit those parts to be readily adjusted rotarily one tooth space at a time by simply withdrawing the bolt —18— from its locking position against the action of a retracting spring —20— shown more clearly in Fig. 4.

A master tooth —21— corresponding to the form required for the teeth of the gear under test is rigidly mounted in a suitable support —22— on the housing —3— so as to extend vertically substantially at right angles to the surface of the base plate —1— in which position, it is held by a locking pin —23— and constitutes the standard by which the form, angle and position of the teeth of the gear ring —A— are to be tested, said master tooth being preferably arranged below the plane of rotation of the teeth of the gear ring and as nearly as possible in vertical alinement with the tooth of the gear ring, which assumes most nearly a vertical position with reference to its length and, for convenience in testing, it is usually located directly below the lower edge of the gear-ring when the latter is adjusted for testing as shown in Figure 2.

An adjusting screw —24— is engaged in a threaded aperture in a stud —25— on the index wheel —8— and has its inner end pivotally connected or swiveled to the outer end of the crank arm —14— for adjusting the shaft —4— with the gear —A— thereon rotarily a sufficient distance to bring the tooth to be tested in proper vertical alinement with the master tooth, it being understood that the index wheel —8— has been previously adjusted to register one of its notches with the locking bolt —18— to cause the locking of the shaft —4— against rotation when the tooth under test is properly alined with the master tooth, after which the mere rotation of the index wheel one toothed space at a time will successively bring the teeth of the gear-ring into proper position for testing.

A surface plate or guide —26— is supported by links —27— upon the base plate —1— for vertical movement into different horizontal planes parallel with that of the base plate for receiving and supporting a traversing plate —28— carrying a dial indicator —29— and a pair of relatively fixed contact members —30—, the latter being located at equal distances from and at opposite sides of the longitudinal center of the traversing plate —28— for contact with opposite faces of the master tooth —21— as the position of the traversing plate —28— is reversed and the lever —38— is also reversed by the rotation of the collar —35—.

The frame or case of the indicator is provided with a radially projecting tubular hub —31— through which is extended a radially movable plunger —32— for operating a pointer —33— around the dial —34— of the indicator, the means for transmitting motion from the plunger to the pointer being of any well known construction not necessary to herein illustrate or describe.

A collar —35— is rotatably mounted upon a bracket —36— on the case of the indicator —29—, (see Figure 2) and is held against axial displacement by a lock nut —37—, the latter engaging the inner threaded end of the hub of the collar —35—, while the outer end of the collar is enlarged and engaged with the outer face of said bracket.

The outer end of the plunger —32— is swiveled to a lever —38— which is fulcrumed at —39— to an arm —40— on the collar —35— and is provided with a contact member —41— for engagement with the working faces of the teeth of the gear —A— as they are successively presented thereto or rather as they are individually brought in alinement with the master teeth —21—, the contact member —41— being disposed in a plane above that of the active contact member —30— a distance corresponding to the distance between the master tooth and gear tooth under test.

That is, when the active contact member —30— is engaged with a definite point on the master tooth —21—, the contact member —41— will be engaged with the corresponding point of the superposed gear tooth under test when the traversing plate —28— is adjusted for such test.

Opposite side edges of the traversing plate —28— are diverging from the end upon which the contact members —30— and —41— are mounted to form equal angles with the longitudinal center of said plate passing through the axis of the plunger —32—, while the contacts —30— are disposed in a transverse plane at right angles to the longitudinal center of the traversing plate or at an angle corresponding to the required angle of the face of the master tooth and gear tooth under test, said diverging edges of this traversing plate being straight and adapted to register with a corresponding straight edge on the supporting plate —26— to enable the traversing plate to be properly set for making the necessary tests.

The narrower end of the traversing plate is provided with an index mark —42— in the longitudinal center thereof for registration with another fixed index mark —43— on the plate —26— so that when these marks are registered, it will bring the active contact point —30— and contact point —41— at the pitch circle of the master tooth —21— and gear tooth under test, respectively.

The means for raising and lowering the plate —26— comprises a cam —45— secured to one end of a shaft —47— having a hand crank —48— by which the cam may be rotated, said crank shaft having an additional axial movement against the action of a compression spring —49— and is provided with a conical brake member —50— movable into and out of engagement with the walls of a conical socket —51— by which the cam —45— and plate —26— may be held in any position of adjustment.

The indicator shown in what is commonly known as the B. C. Ames dial indicator and in making the test, the contact member —41— on the indicator lever —38— is brought into vertical alinement with the active contact member —30— on the plate —28— by abutting both of said contact members against any suitable test block —26'— having a straight surface perpendicular to the plane of the surface plate —26—, and preferably mounted upon the base —1— as shown in Figure 1, it being understood that both contact members are exactly the same distance from the vertical plane of the axis of the plunger —32—.

During this setting of the contact lever —38—, the pointer will be placed in a definite position relatively to the dial after which the dial is adjusted to bring its zero graduation into registration with the pointer, whereupon the plate —28— may be adjusted across and upon the surface plate —26— to bring the contact —30— into engagement with some particular point in the face of the master tooth —21—, while the overlying contact member —41— will be simultaneously brought into contact with a corresponding point of the overlying gear tooth of the gear —A— under test and if under these conditions, the pointer —33— remains at the zero position of the dial, it indicates that that point of the gear tooth is correct or in accordance with the same point of the master tooth. On the other hand, if the point varies one way or the other from the zero position of the dial, it indicates the degree of inaccuracy plus or minus of that particular point and by moving the plate —28— backwards and forwards across the plate —26—, all points in one horizontal plane from the base to the point of the tooth may be similarly tested or by moving the plate —26— to different horizontal planes through the medium of the cam —45— and its operating shaft —47—, all points in the length of the tooth may be tested in like manner or by adjusting the plate —28— to bring its index mark —42— into registration with the fixed index mark —43—, the engagement of the active contact —30— and overlying contact —41— with the master tooth and gear tooth, respectively, will determine the accuracy of the pitch circle of the gear teeth.

The plate —28— is shown by full lines in position for testing the inner faces of the gear teeth but the same test may be made for the opposite faces of the gear teeth by simply reversing the plate —28— end for end upon the plate —26— and also adjusting the collar —35— with the contact lever —38— thereon a half turn to bring its contact member —41— into vertical alinement with the other contact member —30—.

The apparatus shown in Figs. 4 to 8 inclusive for testing spur gears is somewhat similar to that previously described except that the spur gear as —A'— and index wheel —8'— are supported in horizontal planes upon a vertical mandrel —11'— and that the support as —3'— for the mandrel is adjustable horizontally across and upon a base plate —1— toward and from the indicator carriage plate —26— by means of a screw —52—, said plate —3'— being guided in ways —53— on the base plate at right angles to the plate —26—.

The object of this adjustment is to permit the use of the same device for testing spur gears of different diameters.

Another difference of this construction over that shown in Figs. 1, 2 and 3 is that the support as —19'— for the locking bolt —18— is adjustable radially of the axis of the mandrel —11'— along a suitable guide —54— at right angles to the guide-way —3— and is held in its adjusted position by a clamping screw —55— thereby permitting the locking bolt to function with gears of different diameters.

The apparatus shown in Figs. 8 and 9 for testing skew beveled pinions is somewhat similar to that shown in Figs. 1 and 2 except that the mandrel is supported in a plane at an oblique angle rather than a right angle to the base to bring the surfaces of the master tooth and that of the gear under test into substantially the same plane, the angle of the mandrel depending upon the angle of the spiral tooth relatively to the axis of the gear under test.

What I claim is:

1. In an apparatus for testing the accuracy of the contour of gear teeth, the combination of a surface plate, a relatively stationary master tooth, means for supporting the gear to be tested in a position to bring the different elements of the individual teeth into vertical alinement with the corresponding elements respectively of the master tooth, a traversing plate movable along and upon the surface plate and provided with a contact member for engaging the face of the master tooth, and an indicator mounted on the traversing plate to move therewith and provided with a movable contact member and a pointer actuated thereby, said contact member engaging the surface of the tooth under test simultaneously with the engagement of the contact member on the traversing plate with the master tooth.

2. In an apparatus for testing the accuracy of the contour of gear teeth, the combination of a surface plate, a relatively stationary master tooth, means for supporting a gear to be tested in a position to bring the different elements of the individual teeth into vertical alinement with the corresponding elements respectively of the master tooth, a traversing plate movable along and upon the surface plate and provided with a contact member for engaging the face of the master tooth, and an indicator mounted on the traversing plate to move therewith and provided with a movable contact member and a pointer actuated thereby, said contact member engaging the surface of the tooth under test simultaneously with the engagement of the contact member on the traversing plate with the master tooth, and means for adjusting the surface plate with the traversing plate thereon vertically to cause the contact members to be moved lengthwise of the surfaces of the master tooth and gear tooth under test, respectively.

3. In an apparatus for testing the accuracy of the contour of gear teeth, the combination of a means for supporting a gear to be tested to rotate about its axis, a master tooth, means for supporting the master tooth in a position to bring its different elements into vertical alinement with the corresponding elements respectively of one of the teeth of the gear, a surface plate disposed in a plane at right angles to the axis of the gear, means for moving said plate parallel with said axis, an additional plate mounted on the surface plate to move therewith and provided with a contact member for engaging a face of the master tooth, and an indicator mounted on the additional plate and provided with a movable contact member for engaging a corresponding face of the gear tooth.

4. In an apparatus for testing the accuracy of form and position of gear teeth, the combination of means for supporting a gear to be tested to rotate about its axis, a relatively stationary master tooth, means for supporting said master tooth in a position to bring its different elements into vertical alinement with the corresponding elements respectively of one of the gear teeth, an indicator support having a contact member for engaging a face of the master tooth, and an indicator mounted on said support and provided with a contact member movable into and out of alinement with the first named contact member for engaging a corresponding face of the alined gear tooth and normally in axial alinement with the first named contact member, said indicator having means for measuring any deviation of the second named contact member from said alinement when engaged with the gear tooth under test.

5. In an apparatus for testing the accuracy of form and position of gear teeth, the combination of means for supporting a gear to be tested to rotate about its axis, a relatively stationary master tooth, means for supporting said master tooth in a position to bring its different elements into vertical alinement with the corresponding elements respectively of one of the gear teeth, an indicator support having a contact member for engaging a face of the master tooth, an indicator mounted on said support and provided with a contact member movable into and out of alinement with the first named contact member for engaging a corresponding face of the alined gear tooth and normally in axial alinement with the first named contact member, said indicator having means for measuring any deviation of the second named contact member from said alinement when engaged with the gear tooth under test, and means for moving the indicator support and contact members parallel with the axis of the gear.

6. In an apparatus for testing the accuracy of the teeth of gears and analogous objects, the combination of means for supporting the object with the tooth to be tested in a certain position, a dial indicator and a support therefor movable in a definite plane relatively to the tooth under test, said indicator having a movable contact member for engaging one or more points of the part of the tooth under test, and a test block to which the indicator may be set by engagement of its contact member therewith to correspond to the theoretically correct position of the part of tooth under test when the contact member is brought into engagement with said part.

7. In an apparatus for testing the accuracy of form and position of the teeth of gears and analogous objects, the combination of means for supporting said object with the tooth to be tested in a certain position, a test block in fixed relation to the position of the tooth under test, and an indicator having a movable contact member, said indicator being movable to bring its contact member first into engagement with the test block and then into engagement with the part of the tooth to be tested.

In witness whereof I have hereunto set my hand this 10th day of September, 1921.

CLARENCE J. HARTER.

Witnesses:
H. E. CHASE,
M. R. COOKE.